(12) United States Patent
Inoue et al.

(10) Patent No.: US 7,171,802 B2
(45) Date of Patent: Feb. 6, 2007

(54) DIESEL ENGINE COMPRISING DPM FILTER AND METHOD OF ESTIMATING AMOUNT OF DPM TRAPPED IN DPM FILTER

(75) Inventors: Takao Inoue, Yokohama (JP); Junichi Kawashima, Yokosuka (JP); Naoya Tsutsumoto, Yokohama (JP); Makoto Otake, Yokohama (JP); Terunori Kondou, Yokohama (JP); Shouichirou Ueno, Yokohama (JP); Toshimasa Koga, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 121 days.

(21) Appl. No.: 10/934,387

(22) Filed: Sep. 7, 2004

(65) Prior Publication Data
US 2005/0055999 A1    Mar. 17, 2005

(30) Foreign Application Priority Data
Sep. 17, 2003    (JP)    ............................. 2003-325034

(51) Int. Cl.
*F01N 3/00* (2006.01)
*F01N 3/02* (2006.01)
(52) U.S. Cl. .......................................... 60/297; 60/311
(58) Field of Classification Search ................. 60/288, 60/297, 311
See application file for complete search history.

(56) References Cited

U.S. PATENT DOCUMENTS

| | | | | |
|---|---|---|---|---|
| 4,719,751 A | * | 1/1988 | Kume et al. | 60/285 |
| 5,195,316 A | * | 3/1993 | Shinzawa et al. | 60/274 |
| 5,287,698 A | * | 2/1994 | Shinzawa et al. | 60/286 |
| 6,438,948 B2 | * | 8/2002 | Ono et al. | 60/311 |
| 6,574,956 B1 | * | 6/2003 | Moraal et al. | 60/295 |

FOREIGN PATENT DOCUMENTS

JP    2002-256846 A    9/2002

* cited by examiner

*Primary Examiner*—Thomas Denion
*Assistant Examiner*—Loren Edwards
(74) *Attorney, Agent, or Firm*—Foley & Lardner LLP

(57) ABSTRACT

A filter differential pressure, which is the difference between the inlet pressure and the outlet pressure of a DPM filter (11), is determined, and switching is performed in accordance with the regeneration condition of the DPM filter (11) between a first trapped DPM amount calculation process for estimating the trapped DPM amount after complete regeneration, in which all of the DPM trapped in the DPM filter (11) is burned, and a second trapped DPM amount calculation process for estimating the trapped DPM amount when a part of the DPM trapped in the DPM filter (11) has been burned away. The trapped DPM amount in the DPM filter (11) is estimated on the basis of the filter differential pressure using one of the first and second trapped DPM amount calculation processes.

6 Claims, 6 Drawing Sheets

DIESEL ENGINE COMPRISING DPM FILTER AND METHOD OF ESTIMATING AMOUNT OF DPM TRAPPED IN DPM FILTER

TECHNICAL FIELD OF THE INVENTION

This invention relates to a diesel engine, and more particularly to the processing of diesel particulate matter DPM) in exhaust gas.

BACKGROUND OF THE INVENTION

A DPM filter is used to trap diesel particulate matter RPM) contained in exhaust gas as a measure against the black smoke that is produced by diesel engines. In an engine comprising a DPM filter, the temperature of the exhaust gas is raised at a timing when the DPM has accumulated to a certain degree, as a result of which the accumulated DPM is burned, thus regenerating the DPM filter.

If the amount of trapped DPM is large when the DPM filter is to be regenerated, the amount of heat generated by combustion of the DPM increases, causing the temperature of the DPM filter to rise excessively in correlation with the exhaust gas temperature, which is raised to promote regeneration. As a result, the durability of the carrier decreases, leading to thermal degradation of the catalyst in a catalyst-carrying DPM filter, and thus the DPM filter regeneration performance and other catalytic actions may deteriorate. To avoid this problem, the amount of trapped DPM must be estimated accurately, and regeneration must be performed before the trapped DPM amount becomes excessive.

JP2002-256846A, published by the Japan Patent Office in 2002, discloses a method for determining the regeneration timing by estimating the trapped DPM amount from a map using the exhaust gas flow, the difference between the inlet pressure and outlet pressure of the DPM filter (hereinafter referred to as the DPM filter differential pressure), or another index expressing a similar exhaust gas resistance value.

SUMMARY OF THE INVENTION

The map used in the method described in JP2002-256846A assumes that the DPM inside the DPM filter is distributed evenly. Once regeneration has begun, however, the DPM trapped in the DPM filter does not burn evenly in terms of either space or time, and hence the actual DPM distribution inside the DPM filter deviates from the even DPM distribution presumed in the map, making it impossible to estimate the correct trapped DPM amount from the DPM filter differential pressure.

Moreover, depending on the operating condition (traveling condition), regeneration may be interrupted. Likewise when regeneration is interrupted, the DPM distribution becomes uneven, making it impossible to estimate the precise trapped DPM amount from the DPM filter differential pressure.

It is therefore an object of this invention to estimate a trapped DPM amount accurately, even when regeneration is underway or regeneration is interrupted.

In order to achieve above object, this invention provides an engine system comprising a diesel engine; an exhaust passage connected to the engine; a DPM filter provided on the exhaust passage, which traps diesel particulate matter DPM) contained in an exhaust gas of the engine; a temperature adjusting device coupled to the engine, the temperature adjusting device adjusting an exhaust gas temperature of the engine and a controller coupled to the temperature adjusting device. The controller determines a filter differential pressure, which is a difference between an inlet pressure and an outlet pressure of the DPM filter, switches between a first trapped DPM amount calculation process for estimating the trapped DPM amount after complete regeneration, in which all of the DPM trapped in the DPM filter is burned, and a second trapped DPM amount calculation process for estimating the trapped DPM amount when a part of the DPM trapped in the DPM filter has been burned away, in accordance with a regeneration condition of the DPM filter; estimates the trapped DPM amount in the DPM filter on the basis of the filter differential pressure using one of the first and second trapped DPM amount calculation processes; and control the temperature adjusting device to raise the exhaust gas temperature when the estimated trapped DPM amount becomes greater than a predetermined value to regenerate the DPM filter by burning the DPM trapped in the DPM filter.

The details as well as other features and advantages of this invention are set forth in the remainder of the specification and are shown in the accompanying drawings.

DESCRIPTION OF THE PREFERRED EMBODIMENTS

Figure 1:
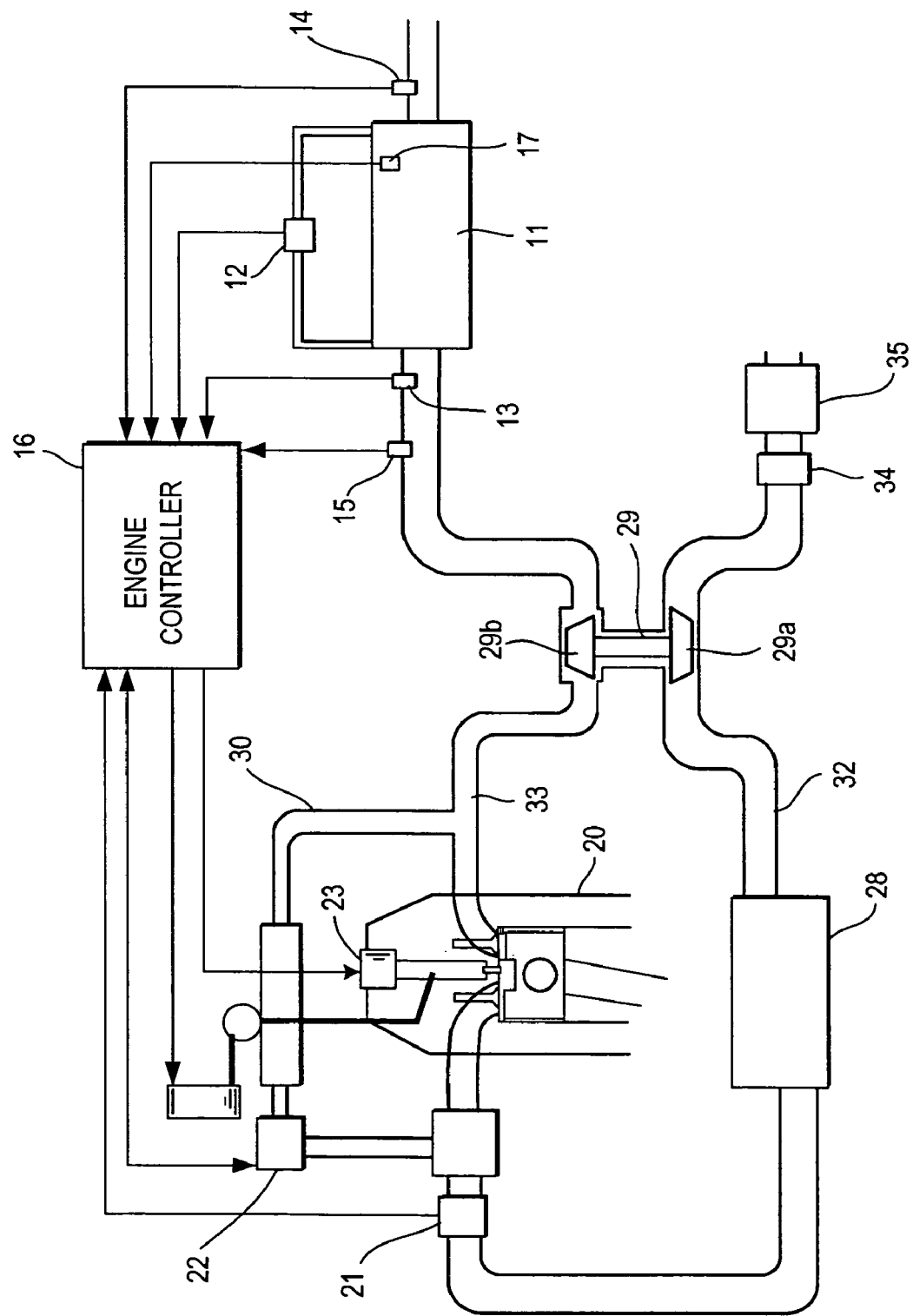
FIG. 1 is a schematic diagram of a diesel engine system with a DPM filter according to this invention.

Referring to FIG. 1 of the drawings, an engine 20 is a diesel engine. A fuel injection valve 23 for injecting fuel is provided at the upper portion of a combustion chamber. An air cleaner 35, an air flow meter 34 which measures the intake air amount, a compressor 29a of a turbocharger 29, an inter cooler 28 which cools air that has been raised to a high temperature through compression by the compressor 29a, and an intake throttle valve 21 which regulates the amount of air that is supplied to the diesel engine 20 are provided on an intake passage 32 of the engine 20.

A turbine 29b of the turbocharger 29, and a DPM filter 11 are provided on an exhaust passage 33 of the engine 20. The turbine 29b is linked to the compressor 29a, and is driven by exhaust gas flowing along the exhaust passage 33. An EGR pipe 30 is provided linking the exhaust passage 33 to the intake passage 32 in order to recirculate a part of the exhaust gas into the intake passage 32, and an EGR valve 22 is provided on the EGR pipe 30 to regulate the amount of EGR.

The DPM filter 11 traps diesel particulate matter (DPM) contained in the exhaust gas from the diesel engine 20. A ceramic porous filter or the like may be used as the DPM filter 11, for example. A differential pressure sensor 12 detects the difference between the inlet pressure and outlet pressure of the DPM filter 11 (the filter differential pressure), and outputs a filter differential pressure signal to an engine controller 16. A temperature sensor 13 detects the inlet temperature of the DPM filter 11, and outputs an inlet temperature signal to the engine controller 16. A temperature sensor 14 detects the outlet temperature of the DPM filter 11, and outputs an outlet temperature signal to the engine controller 16. An air/fuel ratio sensor 15 is a linear air/fuel ratio sensor which detects the air/fuel ratio of the exhaust gas from the diesel engine 20, and is provided on the exhaust passage 33 on the upstream side of the DPM filter 11. Only the stoichiometric air/fuel ratio need be determined by the air/fuel ratio 15, and hence an $O_2$ sensor may be used as the air/fuel ratio 15. A temperature sensor 17 detects the surface temperature of the DPM filter 11, and outputs a surface temperature signal to the engine controller 16.

On the basis of the signals from the sensors 12–14 and 17, the engine controller 16 estimates the amount of DPM trapped in the DPM filter 11, determines when regeneration processing is to be started and stopped, and so on, as will be described below.

Figure 2:
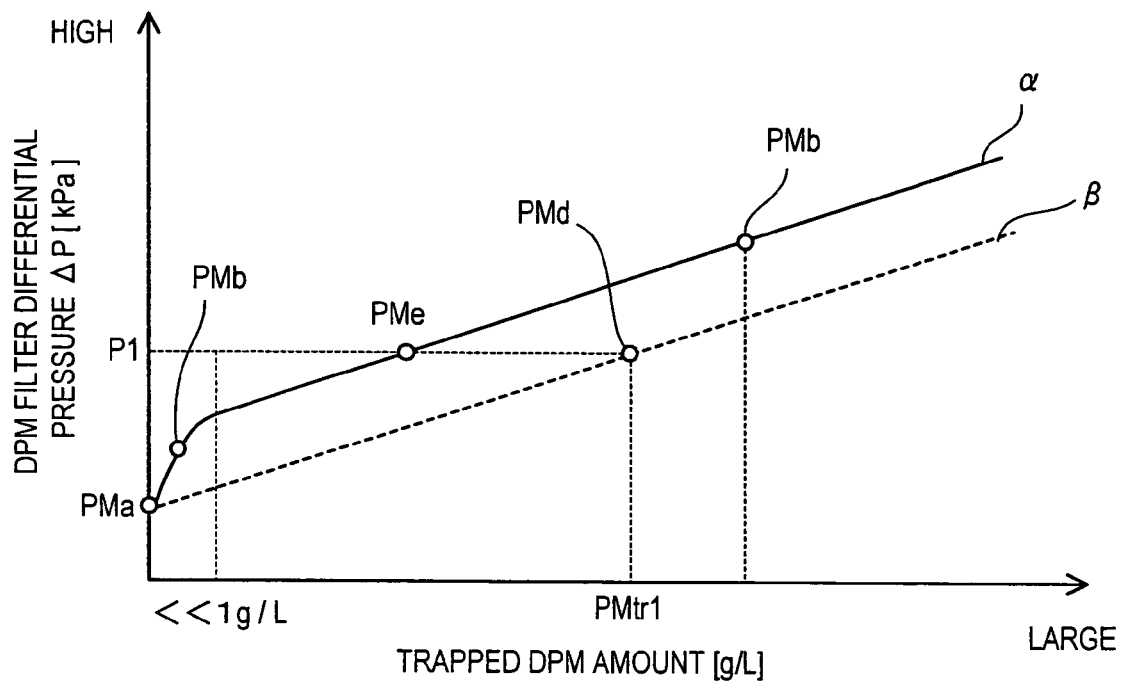
FIG. 2 is a map illustrating the relationship between a filter differential pressure at a predetermined exhaust gas flow and a trapped DPM amount per unit filter volume.

The relationship between the trapped DPM amount and the DPM filter differential pressure will now be described. A solid line α in FIG. 2 is a map (first trapped DPM amount map) showing the relationship between the filter differential pressure and the trapped DPM amount when DPM trapping is performed from a completely regenerated state in which all of the DPM trapped in the DPM filter 11 during the previous regeneration has been burned away. In the diagram, only one solid line α is illustrated, but in actuality, a plurality of the solid lines α are provided in accordance with the exhaust gas flow. As shown by the solid line α, the trapped DPM amount increases as the filter differential pressure increases. FIGS. 3A to 3D show the state of pores 31 in the interior of the DPM filter 11 at points PMa to PMd in FIG. 2 respectively.

Figures 3A, 3B, 3C, 3D:
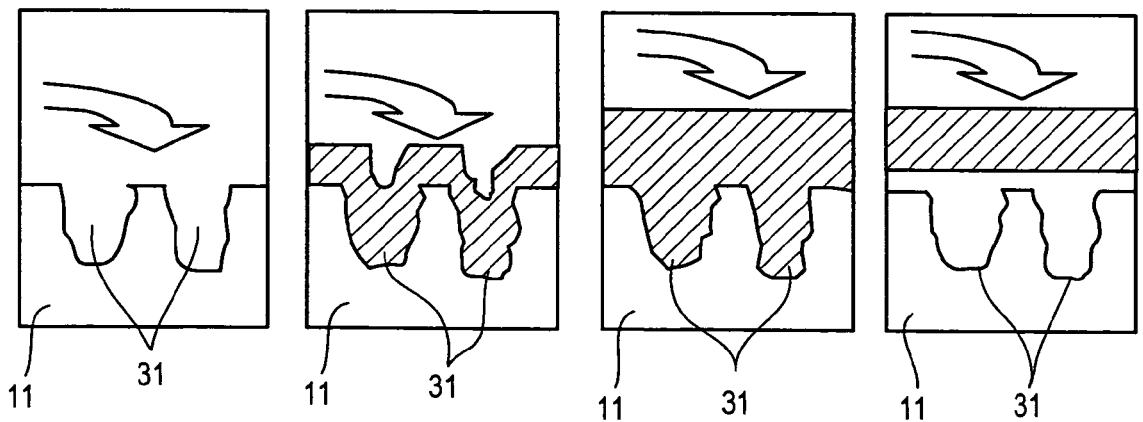
FIGS. 3A to 3D are views illustrating states in which DPM accumulates on the surface of the DPM filter.

At PMa, the trapped DPM amount is zero, and hence there is no DPM accumulation on the surface of the DPM filter 11, as shown in FIG. 3A. Accordingly, the DPM filter differential pressure is the flow resistance of the DPM filter 11 alone.

PMb is a condition in which a small amount of DPM has been trapped, and as shown in FIG. 3B, DPM accumulates preferentially from the pores 3.1 of the DPM filter 11.

PMc is a condition in which DPM has been trapped up to a time directly before the beginning of regeneration. As shown in FIG. 3C, the pores 31 are filled completely, and DPM is accumulating evenly thereabove.

As shown by the solid line α in FIG. 2, as the trapped DPM amount increases gradually from zero, the DPM filter differential pressure rises rapidly at the initial trapping stage up to the point at which the pores 31 are filled, and once the pores 31 are filled completely, the rate of increase slows from the initial trapping stage. The DPM filter differential pressure then rises linearly, at the same rate of increase, in proportion with the trapped DPM amount.

When regeneration is performed from the PMc condition such that a part of the trapped DPM is burned, the DPM burns from the surface side of the DPM filter 11, as shown in FIG. 3D, leading to a condition in which there is no DPM on the filter surface of the DPM filter, including the pores 31.

If a trapped DPM amount during regeneration processing or following an interruption in regeneration is assumed to be PMtr1, then even when the trapped DPM amount PMtr1 is the same, the filter differential pressure is smaller when the DPM on the DPM filter surface is burned away by performing partial regeneration than when the trapped DPM amount reaches PMtr1 in the process of increasing from PMb to PMc, or in other words when the pores 31 are filled completely and DPM accumulates thereabove.

In a conventional estimation method, estimation is performed using the same map that is used following complete regeneration even when regeneration is underway or interrupted, and hence a smaller trapped DPM amount than the actual amount is estimated. At PMd (trapped DPM amount PMtr1, DPM filter differential pressure P1) during regeneration processing or following an interruption in regeneration, for example, the trapped DPM amount is mistakenly estimated as PMe from the DPM filter differential pressure P1 and the solid line α.

Hence during the next regeneration, a greater amount of DPM than the estimated value is trapped in reality, and thus the amount of heat generated by combustion increases, causing the DPM filter temperature to rise excessively in con-elation with the exhaust gas temperature that is raised in order to perform regeneration. This leads to problems such as deterioration and so on in the durability of the carrier, thermal degradation of the catalyst when the DPM filter is of the catalyst-carrying type, and deterioration in the DPM filter regeneration performance and other catalytic actions.

Hence in this invention, a second trapped DPM amount map (the broken line β in FIG. 2) defining the relationship between the filter differential pressure and the trapped DPM amount when regeneration is performed partially, as shown in FIG. 3D, is provided in addition to the first trapped DPM amount map (the solid line α), and these maps are switched according to the regeneration condition to estimate the trapped DPM amount.

The broken line β is a straight line that passes through PMa, and has an identical gradient to the straight line portion of the solid line α once the pores 31 have been filled. A single broken line β corresponding to a certain exhaust gas flow is illustrated in FIG. 2, but in actuality, a plurality of the broken lines β are provided in accordance with the exhaust gas flow.

Figure 4:
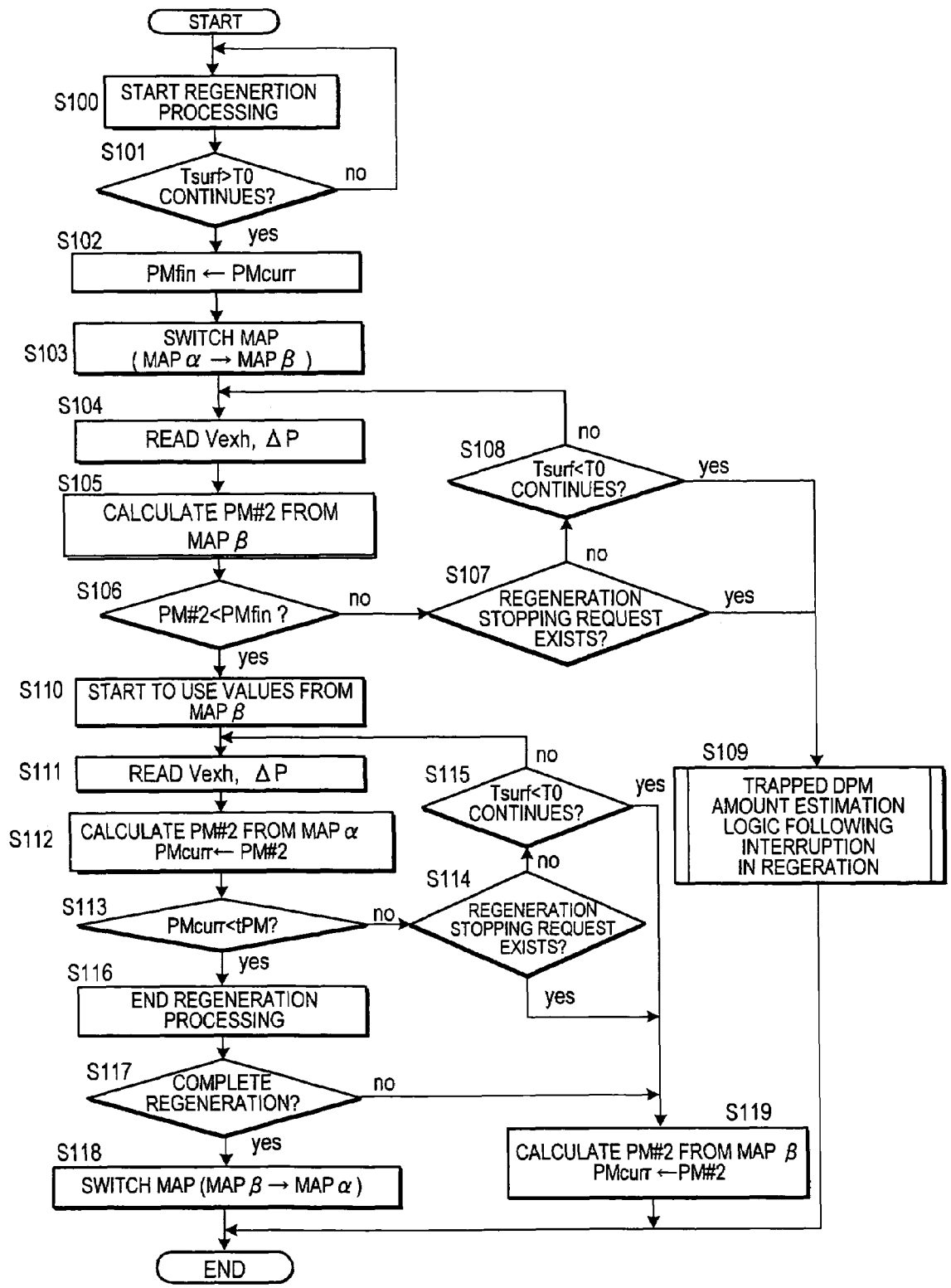
FIG. 4 is a flowchart for estimating the trapped DPM amount during regeneration.

FIG. 4 is a flowchart for estimating the trapped DPM amount during regeneration, which is executed by the engine controller 16.

In a step S100, regeneration processing of the DPM filter 11 is begun. More specifically, the exhaust gas temperature is raised by performing a post-fuel injection following the main fuel injection or retarding the fuel injection timing.

In a step S101, in order to determine whether or not combustion of the DPM has begun, a determination is made as to whether or not a surface temperature Tsurf of the DPM filter 11 has been continuously higher than a DPM combustion start temperature T0, determined in advance by experiment or the like, for no less than a predetermined time. If the determination result is affirmative, the routine advances to a step S102, and if negative, the routine returns to the step S100.

In the step S102, a trapped DPM amount PMcurr at the start of regeneration is stored as PMfin. The trapped DPM amount PMcurr at the start of regeneration is determined by referring to the first trapped DPM amount map α.

In a step S103, regeneration is underway, and hence the map used to estimate the trapped DPM amount is switched from the first trapped DPM amount map α to the second trapped DPM amount map β. The reason for this is that once regeneration processing begins, the DPM on the surface of the DPM filter 11 burns away, thereby reducing pressure loss in the DPM filter 11, and hence the trapped DPM amount cannot be determined accurately using the first trapped DPM amount map α, which is premised on the conditions shown in FIGS. 3A to 3C.

In a step S104, a current exhaust gas flow Vexh and a DPM filter differential pressure ΔP are read. The current exhaust gas flow Vexh can be determined by subjecting the intake air amount measured by the air flow meter 34 to dead time correction and delay correction.

Figure 5:
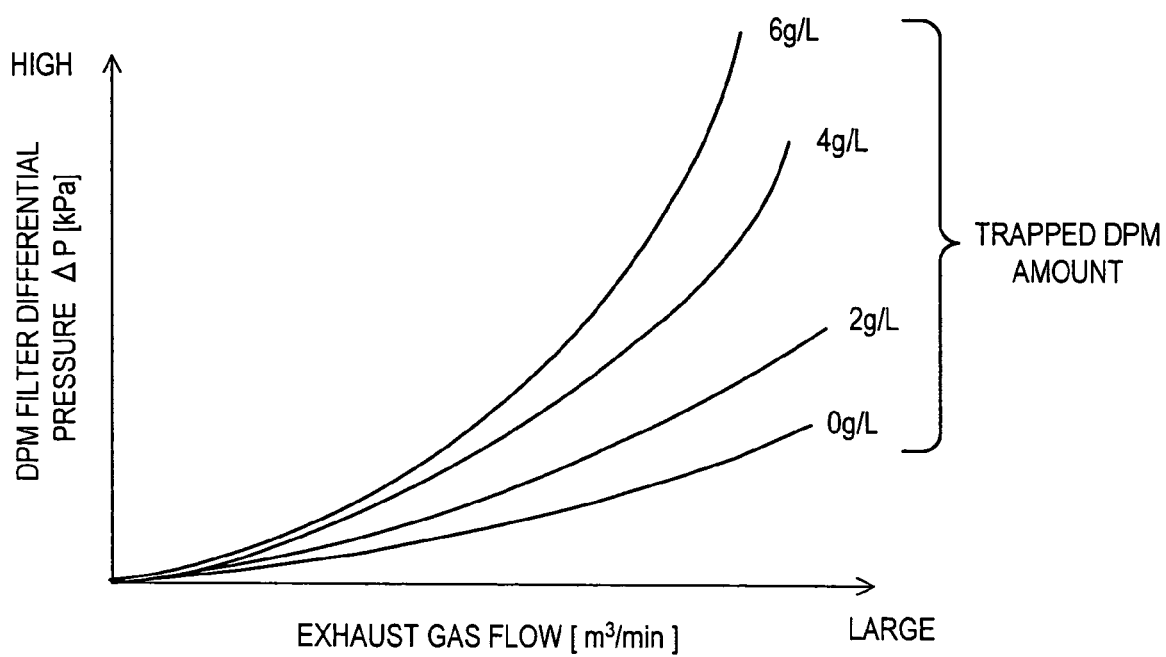
FIG. 5 is a modified example showing a second trapped DPM amount map.

In a step S105, a DPM amount PM#2 is calculated from the second trapped DPM amount map β on the basis of the current exhaust gas flow Vexh and DPM filter differential pressure ΔP. As shown in FIG. 5, the second trapped DPM amount map β may be rewritten as a map illustrating the relationship between the exhaust gas flow and the trapped DPM amount in relation to the DPM differential pressure.

In a step S106, PM#2 calculated in the step S105 is compared to PMfin calculated in the step S103. If PM#2 is smaller than PMfin, the routine advances to a step S110, and if PW#2 is equal to or larger than PMfin, the routine advances to a step S107.

In the step S107, the presence of a regeneration stopping request is determined, and if no regeneration stopping request is present, the routine advances to a step S108. A regeneration stopping request is issued when the trapped DPM amount has fallen below a predetermined value due to regeneration, or when the temperature of the DPM filter 11 has risen to a temperature at which there is a possibility of the DPM filter 11 breaking.

In the step S108, in order to determine whether combustion of the DPM has stopped, a determination is made as to whether or not the surface temperature Tsurf of the DPM filter 11 has been continuously lower than the DPM combustion temperature T0 for a predetermined time. When the determination is negative, the routine returns to the step S104.

If a regeneration stopping request is present in the step S107 and the determination in the step S108 is positive, the routine advances to a step S109, where logic to estimate the trapped DPM amount following an interruption in regeneration, to be described below, is executed.

When the trapped DPM amount PM#2 is smaller than PMfin in the step S106, the routine advances to the step S110, wherefrom values obtained by referring to the second trapped DPM amount map β are used as the estimated value of the trapped DPM amount.

In steps S111, S112, similarly to the steps S104, S105, the current exhaust gas flow Vexh and DPM filter differential pressure ΔP are read to determine the trapped DPM amount PM#2 with reference to the second trapped DPM amount map β, the resulting value being updated as the current trapped DPM amount PMcurr.

In a step S113, a determination is made as to whether or not the current DPM amount PMcurr is smaller than a regeneration end determining DPM amount tPM which is set in advance to determine the end of regeneration processing. If the determination is positive, the routine advances to a step S116, and if negative, to a step S114.

In the steps S114 and S115, identical determinations to those in the steps S107 and S108 respectively are made. If the determination result in one of the steps S114, S115 is negative, the routine advances to a step S119, where calculation of the trapped DPM amount PM#2 using the second trapped DPM amount map β is continued and the current trapped DPM amount PMcurr is updated by the trapped DPM amount PM#2 obtained in this calculation. If the determination result is negative in both of the steps S114, S115, the routine returns to the step S111, where calculation of the trapped DPM amount PM#2 using the second trapped DPM amount map β is repeated.

In the step S116, regeneration processing ends, and the routine advances to a step S117, where a determination is made as to whether the trapped DPM amount PMcurr has reached zero, or the DPM filter differential pressure has fallen below a predetermined value. On the basis of this determination, a determination is made as to whether or not complete regeneration, in which all of the trapped DPM burns away, has taken place.

If complete regeneration has taken place, the routine advances to a step S118, where the map used to calculate the trapped DPM amount is switched to the first trapped DPM amount map α. The trapped DPM amount is then estimated by referring to the first trapped DPM amount α until regeneration processing resumes.

If complete regeneration has not taken place, the routine advances to a step S119, where calculation of the trapped DPM amount PM#2 using the second trapped DPM amount map β is continued, and the current trapped DPM amount PMcurr is updated by the trapped DPM amount PM#2 obtained in this calculation.

Variation in the trapped DPM amount estimated according to the control described above will now be described with reference to FIG. 6.

When regeneration begins, the map used to estimate the trapped DPM amount is switched from the first trapped DPM amount map a to the second trapped DPM amount map β, and hence, if a trapped DPM amount at the start of regeneration processing is assumed to be PMc1 (=PMfin), then the trapped DPM amount following map switching becomes PMc2, which has an equal DPM filter differential pressure to PMc1, on the second trapped DPM amount map β.

The trapped DPM amount PM#2 obtained with reference to the second trapped DPM amount map β following map switching increases beyond the trapped DPM amount PMfin at the start of regeneration processing between PMc2 and PMc3, whereas the actual trapped DPM amount decreases as shown by the solid line γ, for example. Hence there is a large discrepancy between the trapped DPM amount obtained with reference to the second trapped DPM amount map β and the actual trapped DPM amount.

Therefore, the trapped DPM amount is estimated to be PMfin until regeneration progresses to the point at which the trapped DPM amount decreases to PMfin. For example, when the DPM filter differential pressure reaches Pγ1 after the start of regeneration processing such that the actual trapped DPM amount is PMγ1 and the trapped DPM amount obtained with reference to the second trapped DPM amount map β is PMβ1, and the trapped DPM amount is determined using the second trapped DPM amount map β, then the resulting error is PMβ1−PMγ1. However, by assuming the current trapped DPM amount PMcurr to be PMfin at the start of regeneration (a fixed value), rather than a value obtained with reference to the second trapped DPM amount map β, between PMc2 and PMc3, the error can be suppressed to PMfin−PMγ1.

When the trapped DPM amount decreases as a result of regeneration such that the trapped DPM amount determined using the second trapped DPM amount map β falls to PMfin (PMc3), the current trapped DPM amount PMcurr is thereafter updated by the trapped DPM amount determined with reference to the second trapped DPM amount map β whenever necessary. The reason for this is that when the trapped DPM amount determined with reference to the second trapped DPM amount map β becomes smaller than PMfin, the error between the trapped DPM amount determined with reference to the second trapped DPM amount map β and the actual trapped DPM amount can be reduced further using the value obtained with reference to the second trapped DPM amount map β, rather than PMfin, as the trapped DPM amount.

When regeneration progresses further such that the trapped DPM amount PMcurr falls below the regeneration end determining DPM amount tPM, regeneration ends. When the regeneration is complete regeneration (PMc5), in which all of the DPM trapped in the DPM filter 11 burns away, the amount of additional DPM trapped in the DPM filter 11 thereafter is estimated using the filter differential pressure ΔP and the first trapped DPM amount map α.

If, on the other hand, regeneration is interrupted before all of the DPM trapped in the DPM filter 11 has burned (PMc4), the trapped DPM amount continues to be estimated using the second trapped DPM amount map β.

According to this invention, the estimated trapped DPM amount is greater than the actual trapped DPM amount from the beginning of regeneration processing to the point at which the trapped DPM amount determined with reference to the second trapped DPM amount map β falls below PMfin, whereby the trapped DPM amount begins to be estimated using the second trapped DPM amount map β. However, the trapped DPM amount can be estimated with greater precision than in the prior art, where the trapped DPM amount is estimated using the first trapped DPM amount map α even when regeneration is underway.

Moreover, there are advantages to overestimating the trapped DPM amount. By slightly overestimating the trapped DPM amount, even when regeneration is interrupted, the next regeneration process is executed soon, and therefore a situation in which excessive DPM is trapped in the DPM filter 11 such that the temperature of the DPM filter 11 rises excessively during the next regeneration process can be prevented.

Next, logic for estimating the trapped DPM amount when regeneration is interrupted, which is executed in the step S109 of FIG. 4, will be described with reference to the flowchart in FIG. 7 and the map in FIG. 6.

Figure 6:
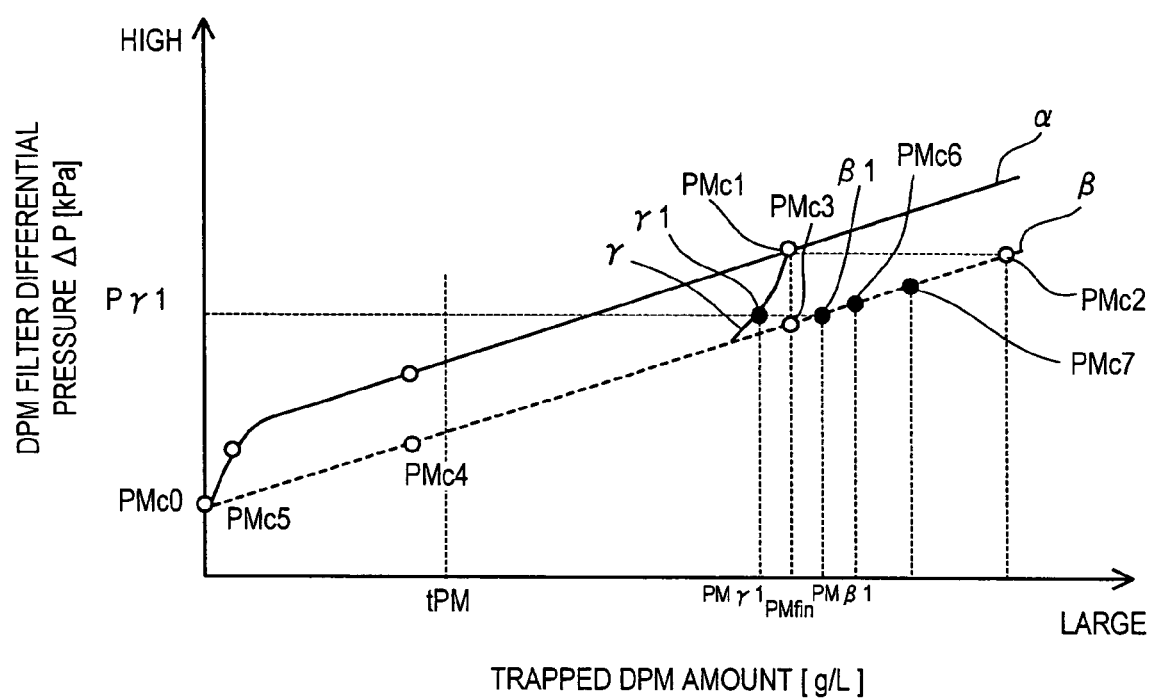
FIG. 6 is a map illustrating the relationship between the DPM filter differential pressure at a predetermined flow, and the trapped DPM amount.
Figure 7:
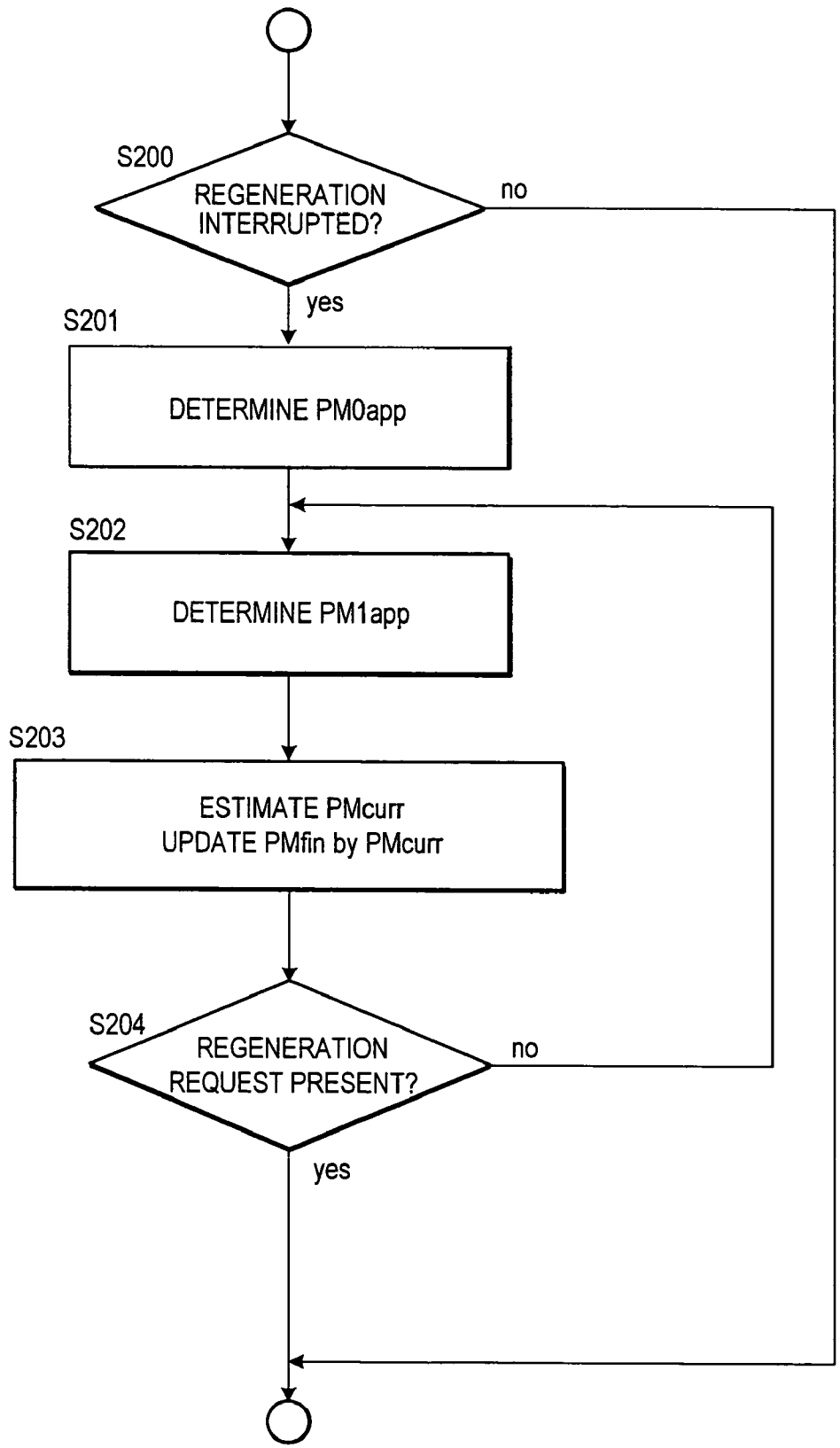
FIG. 7 is a flowchart for estimating the trapped DPM amount following an interruption in regeneration.

This logic is estimation logic used in a case where regeneration begins at PMc1 in FIG. 6, regeneration is interrupted at PMc6, for example, between PMc2 and PMc3, and additional DPM is trapped up to PMc7. In other words, this estimation logic is used in a region where the trapped DPM amount determined with reference to the second trapped DPM amount map β is greater than the trapped DPM amount directly before the start of regeneration. In this region, instead of determining the trapped DPM amount directly from the second trapped DPM amount map β using the DPM filter differential pressure, the trapped DPM amount is estimated using an apparent numerical value obtained with reference to the second trapped DPM amount map β.

In a step S200, a determination is made as to whether regeneration has been interrupted without burning all of the trapped DPM. If the determination is negative, normal control (the control shown in the flowchart in FIG. 4) is returned to, and if the determination is positive, the routine advances to a step S201.

In the step S201, the trapped DPM amount is determined with reference to the second trapped DPM amount map β using the same method as that of the steps S104, S105 in FIG. 4, and the resulting value is set as an apparent trapped DPM amount PM0app directly after an interruption in regeneration.

In a step S202, the trapped DPM amount is determined with reference to the second trapped DPM amount map β using the same method as that of the steps S104, S105 in FIG. 4, and the resulting value is set as an apparent trapped DPM amount PM1app during additional trapping following an interruption in regeneration.

In a step S203, the apparent trapped DPM amount PM0app directly after an interruption in regeneration and the apparent trapped DPM amount PM1app during additional trapping, determined as described above, are used to estimate the current trapped DPM amount PMcurr from the following equation (1).

$$PMcurr = PMfin + (PM1app - PM0app) \quad (1)$$

The trapped DPM amount PMfin, calculated at the start of regeneration processing, is then updated by the estimated current trapped DPM amount PMcurr.

Between PMc2 and PMc3, the trapped DPM amount on the second trapped DPM amount map β is greater than the trapped DPM amount directly before regeneration regardless of the fact that the actual trapped DPM amount is no more than PMfin, and hence the current trapped DPM amount PMcurr cannot be calculated from the map. Likewise, the trapped DPM amount during additional trapping cannot be calculated.

However, the difference between the apparent trapped DPM amount PM1app at PMc7 and the apparent trapped DPM amount PM0app at PMc6 is equal to the difference between the actual trapped DPM amount during additional trapping and the actual trapped DPM amount directly after an interruption in regeneration. The amount of DPM trapped additionally following an interruption in regeneration can therefore be calculated accurately using these differences.

Hence, as shown in Equation (1), assuming that the trapped DPM amount directly after an interruption in regeneration is PMfin, the current trapped DPM amount PMcurr is estimated by adding to PMfin the amount of additionally trapped DPM, which is determined from the apparent trapped DPM amount PM0app directly after an interruption in regeneration and the apparent trapped DPM amount PM1app during additional trapping.

Since variation in the trapped DPM amount following the start of additional trapping can be estimated with a high degree of precision in the manner described above, the error between the trapped DPM amount PMcurr, estimated according to Equation (1), and the actual trapped DPM amount PMcurr corresponds only to the difference between the actual trapped DPM amount following an interruption in regeneration and PMfin. The trapped DPM amount at the start of additional trapping is set to PMfin despite actually falling below PMfin due to regeneration, and hence the trapped DPM amount estimated according to Equation (1) is slightly larger than the actual trapped DPM amount. However, this has the advantage of preventing the filter temperature from rising excessively during regeneration processing as a result of excessive trapping.

In a step S204, the presence of a regeneration request is determined. If a regeneration request is present, the routine returns to the step S100 in FIG. 4, and if no regeneration request is present, the routine returns to the step S202, where the processing of the steps S202 to S204 is repeated until a regeneration request is present.

Although the trapped DPM amount directly after an interruption in regeneration and the trapped DPM amount during additional trapping cannot be determined directly from the second trapped DPM amount map β on the basis of the differential pressure of the DPM filter, the trapped DPM amount can be estimated using the apparent trapped DPM amount as described above.

The entire contents of Japanese Patent Application P2003-325034 (filed Sep. 17, 2003) are incorporated herein by reference.

Although the invention has been described above by reference to a certain embodiment of the invention, the invention is not limited to the embodiment described above. Modifications and variations of the embodiments described above will occur to those skilled in the art, in the light of the above teachings. The scope of the invention is defined with reference to the following claims.

What is claimed is:

1. An engine system comprising:
   a diesel engine;
   an exhaust passage connected to the engine;
   a diesel particulate matter (DPM) filter provided on the exhaust passage, which traps DPM contained in an exhaust gas of the engine;
   a temperature adjusting device coupled to the engine, the temperature adjusting device adjusting an exhaust gas temperature of the engine; and
   a controller coupled to the temperature adjusting device, the controller functioning to:
      determine a filter differential pressure, which is a difference between an inlet pressure and an outlet pressure of the DPM filter;
      switch between a first trapped DPM amount calculation process for estimating the trapped DPM amount after complete regeneration, in which all of the DPM trapped in the DPM filter is burned, and a second trapped DPM amount calculation process for estimating the trapped DPM amount after a part of the DPM trapped in the DPM filter has been burned away, in accordance with a regeneration condition of the DPM filter;
      estimate the trapped DPM amount in the DPM filter on the basis of the filter differential pressure using one of the first and second trapped DPM amount calculation processes; and
      control the temperature adjusting device to raise the exhaust gas temperature when the estimated trapped DPM amount becomes greater than a predetermined value to regenerate the DPM filter by burning the DPM trapped in the DPM filter,
   wherein the first and second trapped DPM amount calculation processes are processes to calculate the trapped DPM amount by referring to a first trapped DPM amount map and a second trapped DPM amount map respectively, and
   in the first and second trapped DPM amount maps, the trapped DPM amount and the filter differential pressure are defined in a substantially linear relationship and when the filter differential pressure is equal, a value obtained by referring to the second trapped DPM amount map is greater than a value obtained by referring to the first trapped DPM amount map.

2. The engine system as defined in claim 1, wherein the relationship between the trapped DPM amount and the filter differential pressure in the first trapped DPM amount map becomes linear when the trapped DPM amount exceeds a predetermined amount, and
   the relationship between the trapped DPM amount and the filter differential pressure in the second trapped DPM amount map is a linear relationship having an equal gradient to the linear part of the first trapped DPM amount map.

3. The engine system as defined in claim 1, wherein the controller further functions to:
   switch the map used to estimate the trapped DPM amount from the first trapped DPM amount map to the second trapped DPM amount when regeneration begins;
   estimate the trapped DPM amount as the value obtained by referring to the first trapped DPM amount map at the start of regeneration until the value obtained by referring to the second trapped DPM amount map becomes smaller than the value obtained by referring to the first trapped DPM amount map at the start of regeneration; and
   estimate the trapped DPM amount as the value obtained by referring to the second trapped DPM amount map when the value obtained by referring to the second trapped DPM amount map becomes smaller than the value obtained by referring to the first trapped DPM amount map at the start of regeneration.

4. The engine system as defined in claim 1, wherein the controller further functions to:
   estimate the trapped DPM amount when regeneration is interrupted before the value obtained by referring to the second trapped DPM amount map becomes smaller than the value obtained by referring to the first trapped DPM amount map at the start of regeneration as a value that is obtained by determining the trapped DPM amount directly after the interruption in regeneration and the trapped DPM amount during additional trapping by referring to the second trapped DPM amount map, and adding a difference between the determined trapped DPM amounts directly after the interruption in regeneration and during additional trapping to the value obtained by referring to the first trapped DPM amount map at the start of regeneration.

5. A method of estimating an amount of diesel particulate matter (DPM) trapped in a DPM filter in a diesel engine comprising an exhaust passage and the DPM filter, which is provided on the exhaust passage and traps DPM contained in an exhaust gas, the method comprising:
   determining a filter differential pressure, which is a difference between an inlet pressure and an outlet pressure of the DPM filter;
   switching between a first trapped DPM amount calculation process for estimating the trapped DPM amount after complete regeneration, in which all of the DPM trapped in the DPM filter is burned, and a second trapped DPM amount calculation process for estimating the trapped DPM amount after a part of the DPM trapped in the DPM filter has been burned away, in accordance with a regeneration condition of the DPM filter; and
   estimating the trapped DPM amount in the DPM filter on the basis of the filter differential pressure using one of the first and second trapped DPM amount calculation processes,
   wherein the first and second trapped DPM amount calculation processes are processes to calculate the trapped DPM amount by referring to a first trapped DPM amount map and a second trapped DPM amount map respectively, and
   in the first and second trapped DPM amount maps, the trapped DPM amount and the filter differential pressure are defined in a substantially linear relationship and when the filter differential pressure is equal, a value obtained by referring to the second trapped DPM amount map is greater than a value obtained by referring to the first trapped DPM amount map.

6. An engine system comprising:

a diesel engine;

an exhaust passage connected to the engine;

a diesel particulate matter (DPM) filter provided on the exhaust passage, which traps DPM contained in an exhaust gas of the engine;

means for determining a filter differential pressure, which is a difference between an inlet pressure and an outlet pressure of the DPM filter;

means for switching between a first trapped DPM amount calculation process for estimating the trapped DPM amount after complete regeneration, in which all of the DPM trapped in the DPM filter is burned, and a second trapped DPM amount calculation process for estimating the trapped DPM amount after a part of the DPM trapped in the DPM filter has been burned away, in accordance with a regeneration condition of the DPM filter;

means for estimating the trapped DPM amount in the DPM filter on the basis of the filter differential pressure using one of the first and second trapped DPM amount calculation processes; and means for raising the exhaust gas temperature when the estimated trapped DPM amount becomes greater than a predetermined value to regenerate the DPM filter by burning the DPM trapped in the DPM filters, wherein the first and second trapped DPM amount calculation processes are processes to calculate the trapped DPM amount by referring to a first trapped DPM amount map and a second trapped DPM amount map respectively, and in the first and second trapped DPM amount maps, the trapped DPM amount and the filter differential pressure are defined in a substantially linear relationship and when the filter differential pressure is equal, a value obtained by referring to the second trapped DPM amount map is greater than a value obtained by referring to the first trapped DPM amount map.

* * * * *